US008063910B2

(12) United States Patent
Swic

(10) Patent No.: US 8,063,910 B2
(45) Date of Patent: Nov. 22, 2011

(54) DOUBLE-BUFFERING OF VIDEO DATA

(75) Inventor: Jerzy Wieslaw Swic, Vancouver (CA)

(73) Assignee: Seiko Epson Corporation, Tokyo (JP)

( * ) Notice: Subject to any disclaimer, the term of this patent is extended or adjusted under 35 U.S.C. 154(b) by 700 days.

(21) Appl. No.: 12/169,123

(22) Filed: Jul. 8, 2008

(65) Prior Publication Data

US 2010/0007673 A1 Jan. 14, 2010

(51) Int. Cl.
*G09G 5/39* (2006.01)
*G09G 5/399* (2006.01)
*G06F 13/372* (2006.01)

(52) U.S. Cl. ......... 345/539; 345/531; 345/534; 345/540

(58) Field of Classification Search .................. 345/531, 345/534, 539, 540, 545, 530
See application file for complete search history.

(56) References Cited

U.S. PATENT DOCUMENTS

| | | | | |
|---|---|---|---|---|
| 5,394,170 | A | 2/1995 | Akeley et al. | |
| 5,808,629 | A | 9/1998 | Nally et al. | |
| 6,335,728 | B1 * | 1/2002 | Kida et al. | 345/204 |
| 6,411,302 | B1 | 6/2002 | Chiraz | |
| 6,667,744 | B2 | 12/2003 | Buckelew et al. | |
| 7,180,521 | B2 | 2/2007 | Inoue et al. | |
| 7,224,368 | B2 | 5/2007 | Estrop et al. | |
| 7,562,184 | B2 * | 7/2009 | Henmi et al. | 711/105 |
| 2003/0174137 | A1 | 9/2003 | Leung et al. | |
| 2007/0070074 | A1 | 3/2007 | Jiang | |

FOREIGN PATENT DOCUMENTS

EP 0801375 A2 10/1997

* cited by examiner

*Primary Examiner* — Hau Nguyen
(74) *Attorney, Agent, or Firm* — Mark P. Watson

(57) ABSTRACT

Data is written to one of two frame buffers in write access cycles having write and non-write sub-periods. Data is read out to a display device from the other of the two frame buffers in read access cycles having read and non-read sub-periods. The writing of data and the reading of data are switched to a respective opposite frame buffer during a switching opportunity, a switching opportunity occurring when a read access cycle is in a non-read sub-period and a write access cycle is in a non-write sub-period. A count of the number of times a switching opportunity is not executed because a read access cycle is in a non-read sub-period while a write access cycle is in a write sub-period is incremented. If the count exceeds a particular threshold, a write access cycle subsequent to the count exceeding the threshold is masked. When a write access cycle is a masked data is not written into a buffer.

23 Claims, 6 Drawing Sheets

DOUBLE-BUFFERING OF VIDEO DATA

FIELD

The present invention relates generally to displaying video images and more particularly to the double-buffering of video data.

BACKGROUND

A video image is formed from a sequence of frames displayed in rapid succession. A video source, such as a camera, may capture individual frames for storage in a memory at an input frame rate. The frames are read out from the memory and transmitted to a display device at an output frame rate for display. An artifact known as "image tearing" can occur when a new frame is stored in the memory at the same time that a previously stored frame is being read out for transmission to the display. If the storing of the new frame overtakes the reading of the previous frame, the displayed image will be a composite of the new and previous frames, and objects that appear in different locations in the two frames will be inaccurately rendered.

To prevent image tearing, a double-buffer technique may be used. The technique requires that the memory be divided into two equally sized buffers, each of sufficient size to store one frame. Generally, the video source writes successive frames to alternate buffers. A frame is read out for display from the buffer last completely updated by the video source. While the video source is writing a frame to a first buffer, a previously stored frame is read out of a second buffer and written to the display device.

A problem sometimes arises, however, when the double-buffer technique is used. The problem is that instead of displaying normal video, the video image freezes on the display device for an abnormally long period of time. This problem is quite objectionable to viewers.

Accordingly, there is a need for methods and apparatus for double-buffering video data in a manner which makes the undesirable image freezing effect inconspicuous.

SUMMARY

The inventor has determined that the cause of the undesirable image freezing effect is a failure to switch buffers after each successive frame is read out for display. More particularly, instead of reading a frame out for display once, the same frame is read out for display multiple times.

In embodiments incorporating principles of the invention, data is written to one of two frame buffers in write access cycles having write and non-write sub-periods. Concurrently with the writing, data is read out to a display device from the other of the two frame buffers in read access cycles having read and non-read sub-periods. The writing of data and the reading of data are switched to a respective opposite frame buffer during a switching opportunity, a switching opportunity occurring when a read access cycle is in a non-read sub-period and a write access cycle is in a non-write sub-period. A count of the number of times a switching opportunity is not executed because a read access cycle is in a non-read sub-period while a write access cycle is in a write sub-period is incremented. If the count exceeds a particular threshold, a write access cycle subsequent to the count exceeding the threshold is masked. When a write access cycle is a masked data is not written into a buffer. For this reason, when a read access cycle is in a next non-read sub-period, a write access cycle will be in a non-write sub-period, and a buffer switch will be permitted. In this manner, buffer switches may occur after each successive frame is read out, but if this does not occur, then buffer switches will occur after each occurrence of the count exceeding the threshold. The buffer switches that occur after the count exceeds the threshold limit the duration of any video image freezing so as to make the freezing effect inconspicuous.

This summary is provided to generally describe what follows in the drawings and detailed description and is not intended to limit the scope of the invention. Objects, features, and advantages of the invention will be readily understood upon consideration of the following detailed description taken in conjunction with the accompanying drawings.

BRIEF DESCRIPTION OF THE DRAWINGS

Generally, in the drawings and description below, the same reference numbers are used in the drawings and the description to refer to the same or like parts, elements, or steps.

DETAILED DESCRIPTION

Figure 1:
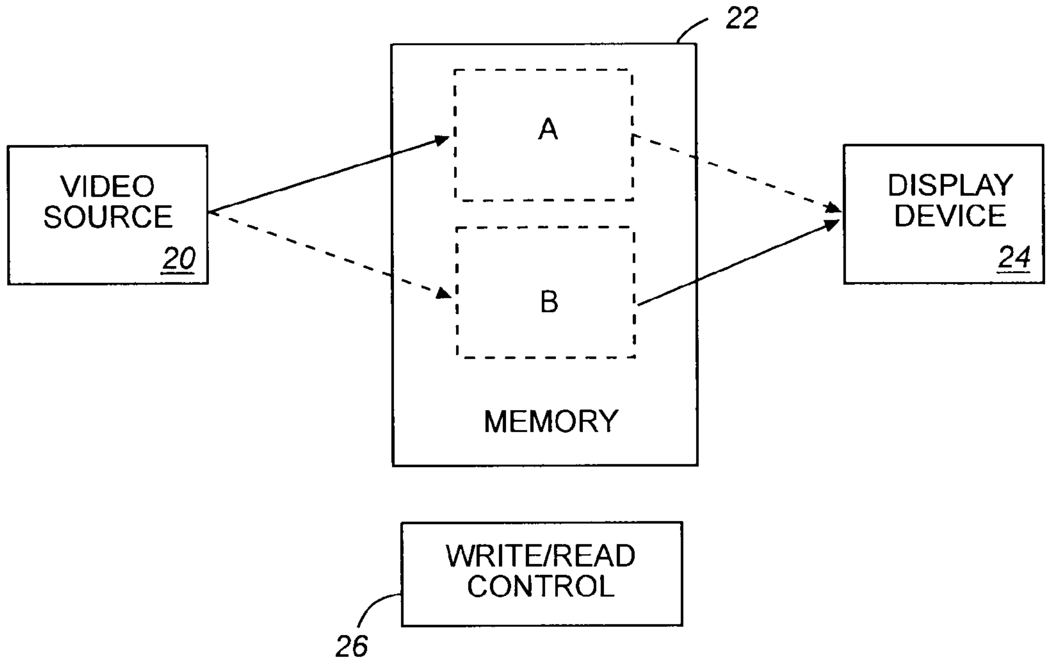
FIG. 1 is a block diagram of one embodiment of a video display system having a memory according to one embodiment.

FIG. 1 is a block diagram illustrating a video source 20, a memory 22, and a display device 24. The memory includes two equally-sized frame buffers A and B, each for storing a frame. Under ideal conditions, the video source writes frames to alternate buffers. On the display side, a frame is fetched for display from the last buffer to which a complete frame was written. Accordingly, successive frames are read out from alternate buffers under ideal conditions. While the video source is writing a frame to a first buffer, a previously stored frame is read out of a second buffer and written to the display device. A write/read control block 26 controls the storing of frames received from the video source in the memory 22 as well as the reading of frames from the memory for presentation to the display device 24.

The video source 20 may be a camera, a CCD sensor, a CMOS sensor, a memory storing video data, a receiver for receiving transmitted video data, or any other suitable video source. The memory 22 may be an SRAM, DRAM, FLASH, hard disk, or any other suitable memory. It is not critical that the frame buffers A and B be contained in a single memory. In one alternative, two separate memories may be provided. The display device 24 may be an LCD, CRT, plasma, OLED, electrophoretic, or any other suitable display device.

Frames of video data may be out from the memory using either a progressive or an interlaced scanning technique. When progressive scanning is employed, the entire frame is read out in raster order, i.e., line by line, from top to bottom. When interlaced scanning is employed, each frame is divided into two fields, where one field contains all of the odd lines and the other contains all of the even lines. While the examples and embodiments described herein assume a method for storing and a method for reading, the present invention is not limited to the methods disclosed in any particular example. In alternative embodiments, progressive scanning may be used for both storing and reading, interlaced scanning may be used for both storing and reading, interlaced scanning may be used for storing while progressive scanning may be used for reading, or progressive scanning may be used for storing while interlaced scanning may be used for reading.

The frames of video data may be pixel data ready for display without further processing. It is not critical, however, that the data read out from the memory be pixel data which is ready for display. In one embodiment, the frames of video data may be compressed video data. For example, video data may be compressed according to an MPEG, VP6, Sorenson, WMV, RealVideo, or any other suitable compression standard. If the video data is in compressed form, it may be stored on a block-by-block basis rather than a line-by-line in a progressive or interlaced scan. In one alternative, the pixel data may be in a color format such as YUV which requires conversion to RGB before display. If the video data is in a color format requiring color conversion, the video data may be stored in a manner that is conventional for such data. For example, the video data of a frame may be stored as blocks of pixel components.

Figure 2:
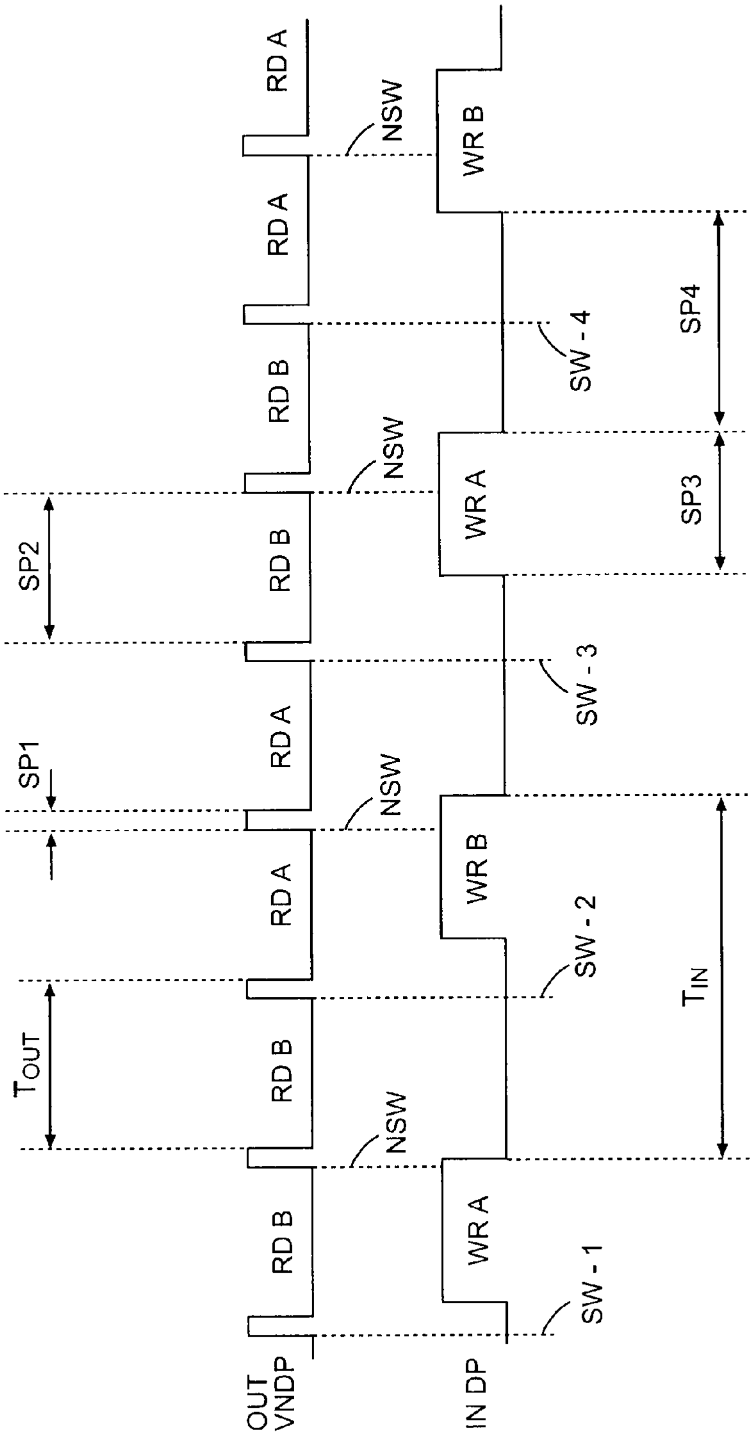
FIG. 2 is a timing diagram illustrating exemplary waveforms for writing frames to and reading out frames from the memory of FIG. 1.

FIG. 2 is a timing diagram that shows exemplary waveforms for writing frames to and reading out frames from the memory 22 of FIG. 1. A first waveform, "OUT VNDP," is representative of a vertical non-display period signal associated with the reading out of frames from the memory 22 for display. In this example, OUT VNDP is active high. A read access cycle has a period of $T_{OUT}$ and is comprised of two sub-periods SP1 and SP2. The OUT VNDP signal is asserted at the conclusion of reading a frame from one of the buffers, and the signal remains asserted until the next reading of the memory begins. The OUT VNDP signal is de-asserted while a frame is being read. It may be seen that each read access cycle is comprised of a non-read sub-period, SP1 and a read sub-period, SP2.

A second waveform, "IN DP," is representative of a display period signal associated with the writing of frames to the memory 22. In this example, IN DP is active high. A write access cycle has a period of $T_{IN}$ and it is comprised of two sub-periods, a write sub-period, SP3 and a non-write sub-period, SP4. The IN DP signal is asserted at the start of writing a frame to one of the buffers, and the signal remains asserted until the writing of the frame is complete. The IN DP signal is de-asserted when the video source is not writing a frame. It may be seen that each write access cycle of the display period signal is comprised of a write sub-period, SP3 and a non-write sub-period, SP4.

FIG. 2 also includes labels "RD A," "RD B," "WR A," and "WR A," signifying, respectively, sub-periods of reading from buffers A and B, and writing to buffers A and B. For example, in each of the first two read access cycles, the data stored in buffer B is read out for display, while in the first write access cycle, data is stored in buffer A. In the example shown in FIG. 2, an interlacing scheme is employed on the read side, and therefore, each read access reads one-half of a full frame, i.e., one read access reads an odd field and the other read access reads an even field. On the write side, a progressive scheme is employed.

Each time the reading logic finishes reading out a frame, i.e., when OUT VNDP is asserted, there is an opportunity for the read logic to switch buffers. However, the write/read block 26 includes a control which prevents a buffer switch if it would result in the reading of a buffer currently being written to by the video source. In particular, when the OUT VNDP signal enters a non-read sub-period (SP1), the reading logic checks to see if the IN DP signal is in a write sub-period (SP3), i.e., the reading logic checks to see if the video source is currently writing a frame to the memory. If the IN DP signal is in a write sub-period (SP3), the control prevents reading logic in the write/read block 26 from switching buffers. On the other hand, if the IN DP signal is in a non-write sub-period (SP4), the control permits the reading logic to switch buffers. In addition, when the reading logic switches buffers, this event causes write logic in the write/read block 26 to also switch buffers.

In FIG. 2, each point where OUT VNDP is first asserted and IN DP is de-asserted is labeled "SW-#," signifying a switching opportunity for which a buffer switch occurs. In addition, each point where OUT VNDP is first asserted and IN DP is asserted is labeled "NSW," signifying a switching opportunity for which a buffer switch does not occur. A point in or period of time SW-# may be referred to as an executed switching opportunity and a point in or period of time NSW may be referred to as a non-executed switching opportunity, as further explained below.

In a first example, the input frame rate of the video source in FIG. 2 is about 28.2 fps (frames per second) and the output frame rate of the display device is set to 60 fps, i.e., the input frame rate is about 47 percent of the output frame rate. In addition, the write sub-periods SP3 are about 0.0139 s (seconds) and the read access cycles $T_{OUT}$ are about 0.0167 s, i.e., the sub-periods SP3 are about 83 percent of the read access cycles $T_{OUT}$. Further, the non-write sub-periods SP4 are about 0.0216 s, which is about 1.29 times the length of the read access cycles $T_{OUT}$.

The example presented in FIG. 2 does not exhibit the video image freezing problem. The example presented in FIG. 2 illustrates that the video image freezing problem may be avoided if the timing of the read and write access cycles conform to certain limitations. These limitations may be expressed in two alternative formulations. First, (a) if the input frame rate of the video source is less than one-half of the output frame rate of the display device, and (b) if the write sub-periods SP3 of the write access cycles are shorter than the full read access cycles, then the video image freezing problem may be avoided. (In the cases of interleaved writing or reading, the limitation (a) should be stated in terms of an input field rate or output field rate, as applicable.) In the example presented in FIG. 2, the input frame rate is 47 percent of the output frame rate and the write sub-periods SP3 are only 83 percent of the full read access cycles $T_{OUT}$, so both limitations are satisfied.

Under an alternative constraint, if the non-write sub-periods SP4 are longer than the read access cycles $T_{OUT}$, then the video image freezing problem may be avoided. In the example of FIG. 2, the non-write sub-periods SP4 are longer (1.29 times) than the read access cycles $T_{OUT}$, so the alternative limitation is satisfied. This alternative constraint is equivalent to the first set of limitations.

It is not always possible, however, to satisfy these limitations. Under either alternative set of limitations, if the condition or conditions are not satisfied, the video image freezing effect may occur.

Figure 3:
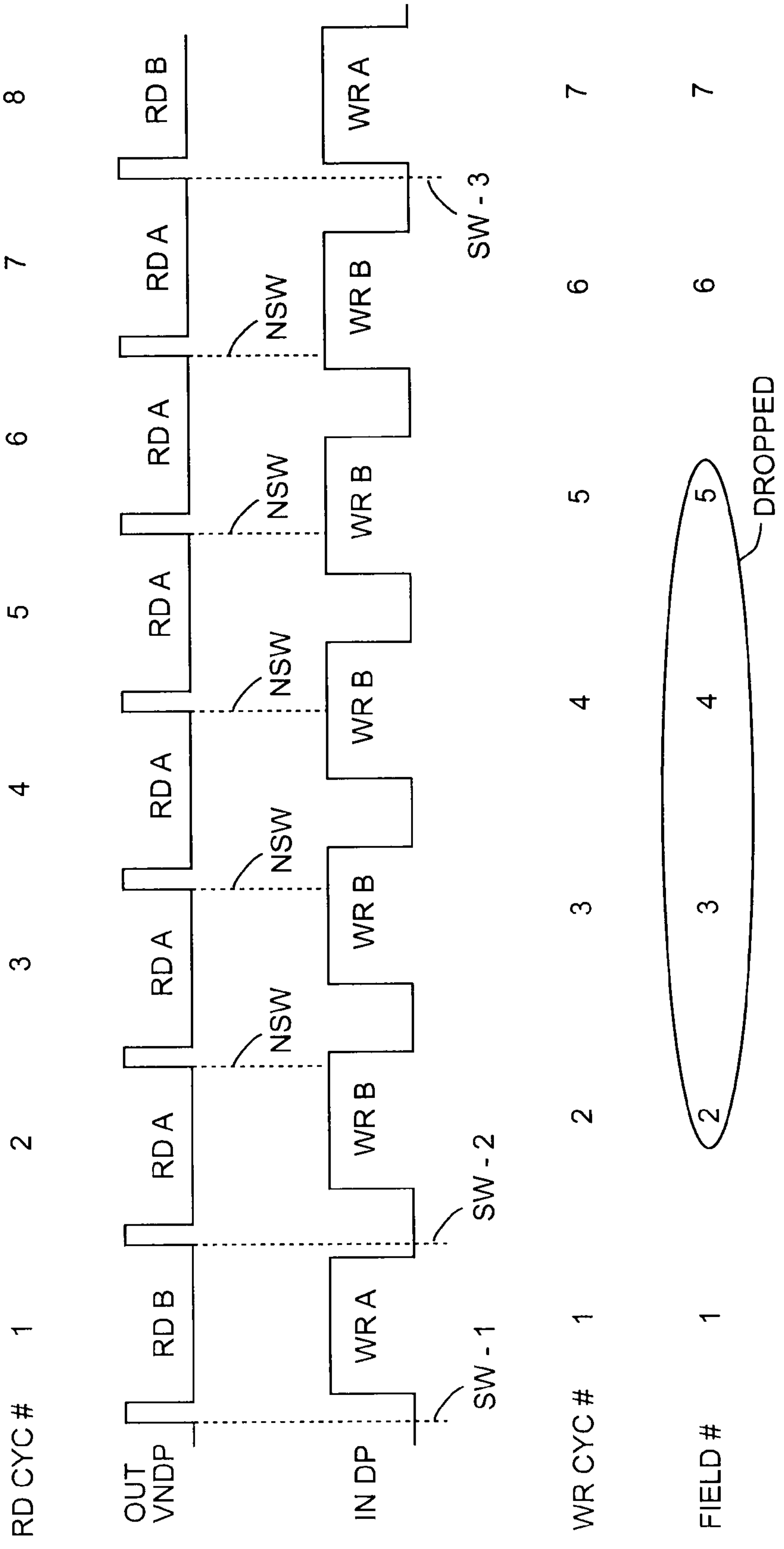
FIG. 3 is a timing diagram illustrating exemplary waveforms for writing frames to and reading out frames from the memory of FIG. 1, wherein the waveforms do not satisfy certain limitations for avoiding video image freezing.

FIG. 3 is a timing diagram illustrating exemplary waveforms for writing frames to and reading out frames from the memory 22 of FIG. 1. The waveforms in FIG. 3 do not satisfy the limitations for avoiding video image freezing. (It may be assumed that the write/read block 26 includes structure which embodies principles of the invention described below, but that such structure is disabled for the purpose of generating the waveforms shown in FIG. 3.) In FIG. 3, frames are read out using interlaced scanning, and the output frame rate (OUT VNDP) is set at the same frame rate as the output frame rate in FIG. 2, i.e., 60 fields per second. In many situations, it is desirable to hold the frame rate on the display side constant. For example, it may be a requirement to provide a "TV output." The frame rates for TV output are set by industry standards and, as such, it is not possible to vary the output frame rate without violating the standard. As an example, two frame rates set by industry standards for TV output are 24 and 30 fps. (Sixty interlaced frames per second is equivalent to 30 progressive fields per second.)

In the example shown in FIG. 3, frames are presented for storing using an interlacing scheme and the input frame rate of the video source is about 52.17 fps, i.e., the input frame rate is about 87 percent of the output frame rate of the display device. In addition, the write sub-periods SP3 are about 0.0128 s, which is about 77 percent of the read access cycles $T_{OUT}$. Further, the non-write sub-periods SP4 are about 0.0064 s, i.e., the non-write sub-periods SP4 are about 38 percent of the length of the read access cycles $T_{OUT}$. Thus, the condition (a) of the first set of criteria mentioned about is not met; the input frame rate is not less than half the output frame rate. Rather, the input frame rate is 87 percent of the output frame rate. Further, the alternative constraint is not satisfied; the non-write sub-periods SP4 are not longer than the read access cycles. The non-write sub-periods SP4 are less than 40 percent of the read access cycles.

It can be seen in FIG. 3 that there is a buffer switch (SW-2) after the first read access cycle, but a buffer switch does not occur in the second through the sixth read access cycles. It is not until read access cycle 7 that another buffer switch (SW-3) occurs. The result is that the frame stored in buffer A in the first write access cycle is read out for display in six consecutive read access cycles (cycles 2-7). Assuming that the display frame rate is 30 fps (60 fields per second interlaced), the frame stored in buffer A would be rendered on the display for about 0.1 seconds instead of about 0.033 seconds. In other words, the video image would freeze on the display for about one-tenth of a second.

Another aspect of the video image freezing problem may be seen in FIG. 3. FIG. 3 shows the number of the field being presented by the video source in each write access cycle. In write access cycle 1, field 1 is presented, in write access cycle 2, field 2 is presented, and so on. The additional problem is that after displaying a single frame for an extended period, the next frame displayed is not the next sequential frame in the sequence of video frames. Rather, N successive frames (or fields) are skipped and an N+1$^{th}$ successive frame is displayed, N being two or more. In the example presented in FIG. 3, a frame which includes field 1 is displayed, four fields (2-5) are dropped, and then a frame which comprised of fields 1 and 6 is displayed. In other words, some later frame in the video sequence is displayed rather than the next sequential frame. When this problem occurs, a viewer may see moving objects in the video momentarily freeze and when the freezing stops, the objects are initially rendered incorrectly, i.e., the image exhibits a "comb" effect. Generally, a comb effect will be less pronounced if the fields are from frames close together in the frame sequence and more pronounced if the two fields are from frames widely separated in the frame sequence. For example, a comb effect created from sequentially adjacent frames may not be noticeable. This video image freezing, followed by incorrect image rendering is objectionable to viewers, particularly when the fields are from relatively, widely spaced-apart frames.

Figure 4:
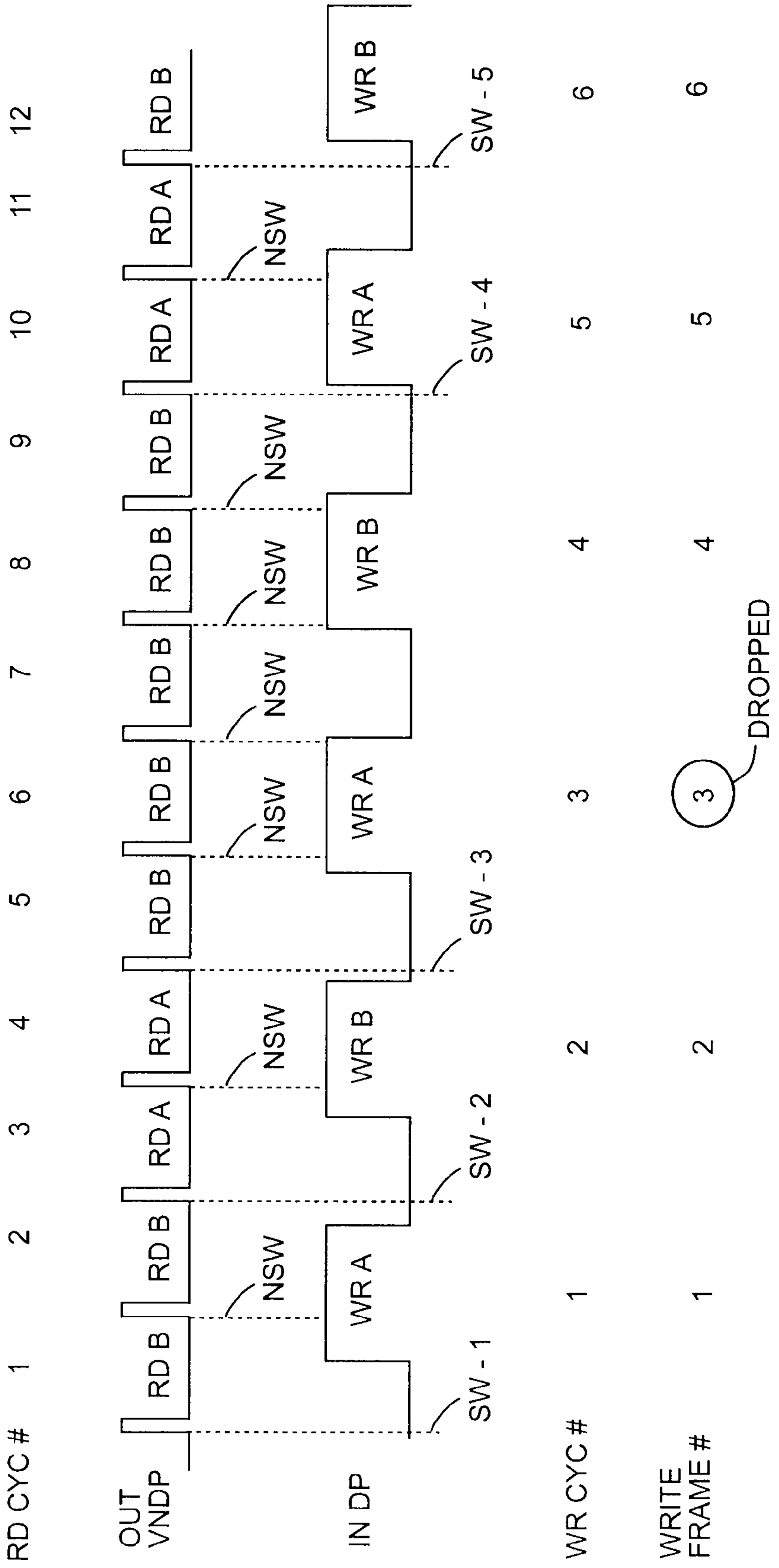
FIG. 4 is a timing diagram illustrating second exemplary waveforms for writing frames to and reading out frames from the memory of FIG. 1, wherein the waveforms do not satisfy certain limitations for avoiding video image freezing.

FIG. 4 illustrates a second example where the limitations are not satisfied and the video image freezing effect arises. (It may again be assumed that the write/read block 26 includes structure which embodies principles of the invention described below, but that such structure is disabled for the purpose of generating the waveforms shown in FIG. 4.) The output frame rate of the display device in FIG. 4 is set to 60 fps, which is the same rate as in FIGS. 2 and 3. The input frame rate of the video source is about 28.33 fps. In the example presented in FIG. 4, the input frame rate of the video source is about 47 percent of the display device frame rate. In addition, the write sub-periods SP3 are about 118 percent of the read access cycles $T_{OUT}$. Further, the non-write sub-periods SP4 are about 94 percent of the length of the read access cycles $T_{OUT}$. Thus, the condition (b) of the first set of criteria is not met; the write sub-periods are not shorter than the read access cycles, they are 18 percent longer. Further, the alternative constraint is not satisfied; the non-write sub-periods are not longer than the read access cycles, they are about six percent shorter.

It can be seen in FIG. 4 that there are buffer switches in the second and fourth read access cycles (SW-2 and SW-3), but a buffer switch does not occur again until the ninth read access cycle. The result is that the frame stored in buffer B in the second write access cycle is read out for display in read access cycles 5-9, and frame 3 is dropped.

The inventor has observed video image freezing of two or three seconds. Moreover, the video image freezing was observed to repeat multiple times at various points in the video stream. The duration, number, and points of occurrence of video image freezing in a video stream are not capable of being readily predicted. In practice, the determination of the extent that video image freezing is a problem for a particular set of input and output rates (when the limitations described above are violated) is determined by viewing the resulting video image.

While four fields are dropped in the example of FIG. 3 and one frame is dropped in the example of FIG. 4, it should be understood that these examples are not intended to illustrate the video image freezing observed by the inventor. It should be appreciated that FIGS. 3 and 4 represent an observation of the IN DP and OUT VNDP waveforms over a very small part of the entire period such waveforms would need to be produced to generate a typical video. If a plurality of such observation periods of short duration were made, it would be seen that, for a given set of read and write rates, there may be no frame dropping in some observation periods while in other observation periods multiple frames may be dropped. To fully illustrate the problem as observed it would be necessary depict thousands of access cycles. It is believed that this would unnecessarily obscure and complicate the present disclosure. For this reason, the examples presented herein are intended to show the cause of the video image freezing problem, but not necessarily to show the actual waveforms that produced the video freezing observed by the inventor. In this regard, it will be appreciated that the examples depicted herein may or may not produce video image freezing in a particular environment.

It should also be understood that whether the frame dropping presented in FIGS. 3 and 4 is observable depends on the frame (or field) rates. For instance, if the input frame rate is relatively slow, the dropping of a single frame may be noticeable, whereas if the input frame rate is relatively fast, the dropping of a single frame may not be noticeable.

Figure 5:
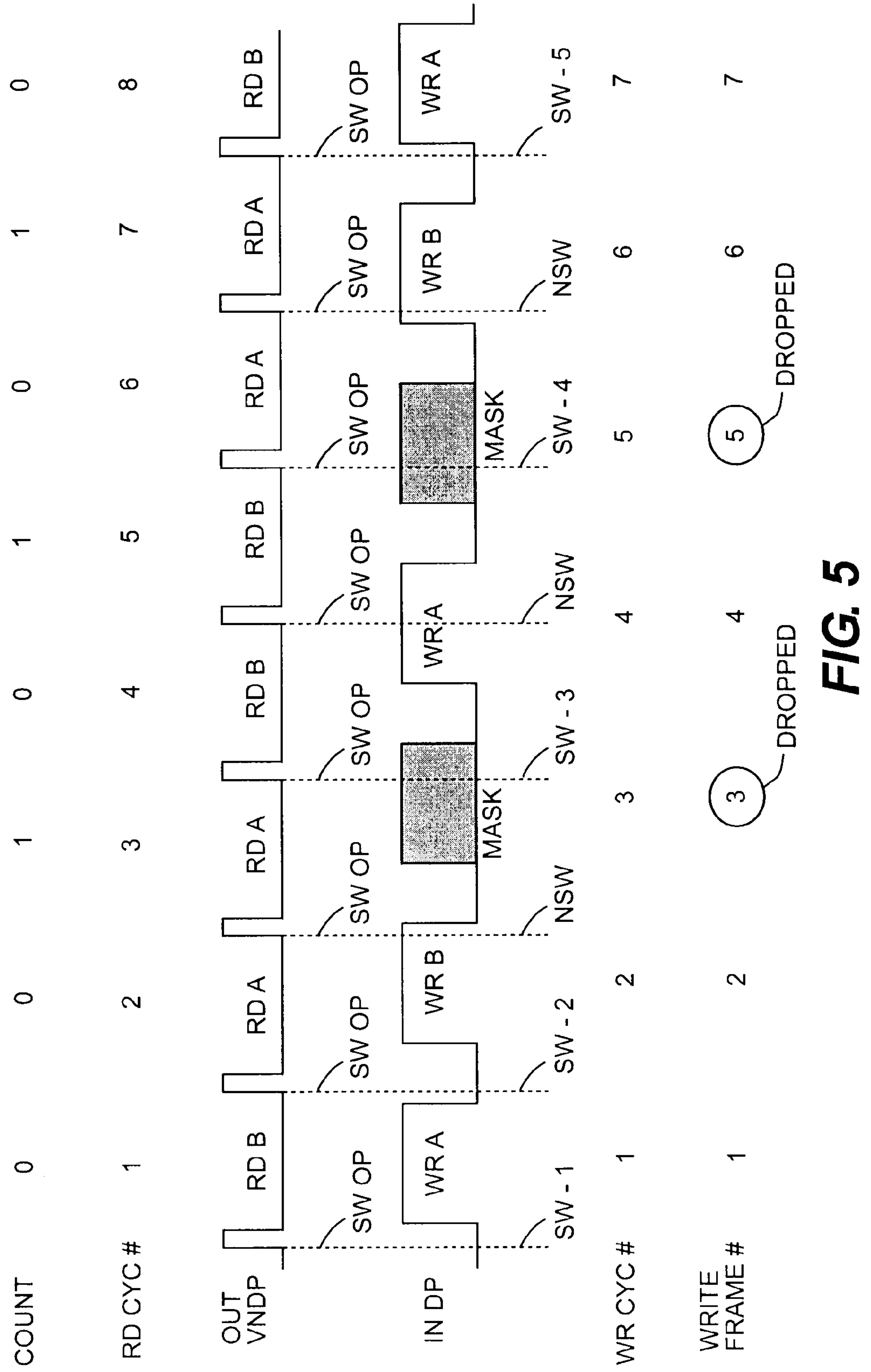
FIG. 5 illustrates a timing diagram according to one embodiment.

FIG. 5 illustrates a timing diagram according to one embodiment. Referring to FIG. 5, image data is written to one of two frame buffers in the memory 22 by the video source 20 in write access cycles having a write sub-period and a non-write sub-period, SP3 and SP4, respectively. Concurrently with the writing, image data is read out to the display device 24 from the other of the two frame buffers in read access cycles having a read sub-period and a non-read sub-period, SP2 and SP1, respectively. The writing of image data and the reading of image data are switched to the respective opposite frame buffer during periods when a read access cycle is in a non-read sub-period, SP1 if a write access cycle is in a non-write sub-period, SP4.

A "switching opportunity" refers to a time period during which a frame stored in the one of the buffers has been read out for transmitting to the display, but the reading of a next subsequent frame has not yet started. According to one embodiment, a switching opportunity occurs at the start of the vertical non-display sub-period of the display device 24. Each switching opportunity is labeled "SW OP" in FIG. 5. A buffer switch may or may not occur at a switching opportunity. If the fetching of data for display is unable to switch to an alternate buffer during a switching opportunity because the video source 20 is writing to a buffer during the switching opportunity, the switching opportunity is a "non-executed" switching opportunity, "NSW." On the other hand, if the fetching of data for display is able to switch to an alternate buffer during a switching opportunity, the switching opportunity is an "executed" switching opportunity, "SW-#."

According to the principles of the invention, each non-executed switching opportunity is counted. In other words, a count is kept of the number of times a write access cycle is in a write sub-period SP3 at the start of the non-read sub-period SP1 of a read access cycle. In one embodiment, the count value may be stored in a variable "COUNT." If the counting is interrupted by an executed switching opportunity, COUNT is reset. Each time COUNT is incremented, it is compared with a particular threshold. In one embodiment, COUNT is reset to zero and counts up to the threshold. In another embodiment, COUNT is reset to the threshold and counts down to zero.

FIG. 5 shows the value of COUNT for each read access cycle. If COUNT exceeds the particular threshold, a mask is set in the write access cycle subsequent to the count exceeding the threshold. When the write mask is set or enabled, the video source is prevented from writing to a buffer. Thus, when the write mask is enabled, the control on the reading logic that prevents the reading of a buffer currently being written to by the video source will not be invoked. The fetching of data for display will switch to an alternate buffer during a switching opportunity if the mask is enabled. Accordingly, if COUNT exceeds the threshold, the mask is set and the next switching opportunity will be executed. In addition to resetting COUNT, the mask is reset or disabled when a buffer switch occurs.

The same waveforms for OUT VNDP and IN DP shown in FIG. 3 are presented in FIG. 5. As mentioned above, frames are read out using interlaced scanning, and the output frame rate (OUT VNDP) is set to 60 fps. Frames are presented for storing using an interlacing scheme and the input frame rate of the video source is about 52.17 fps. The condition (a) of the first set of criteria is not met. The input frame rate is not less than half the output frame rate. In addition, the alternative constraint is not satisfied; the non-write sub-periods SP4 are not longer than the read access cycles. The non-write sub-periods SP4 are about 38 percent of the read access cycles.

Referring to FIG. 5, the display reads from buffer A in read cycle 2, and on the rising edge of the non-read sub-period SP1, a buffer switch does not occur because the video source is in a write sub-period SP3. The start of the non-read sub-period SP1 in read cycle 2 represents a non-executed switching opportunity. Since a buffer switch does not occur, COUNT is incremented and compared to a threshold. In this example, the threshold equals one. When COUNT is incremented, the value of COUNT equals one, which is equal to the threshold. Accordingly, the write mask is enabled. The write access cycle that is masked is the write cycle immediately subsequent to COUNT exceeding the particular threshold. In this example, the write access cycle 3 is masked, as indicated by the shaded portion of the IN DP waveform in FIG. 5.

When read cycle 3 starts, the display again reads from buffer A because this is the buffer to which a complete frame was last written. On the rising edge of the non-read sub-period of read access cycle 3, the state of the write cycle is checked. Because the write cycle is masked, the video source 20 does not write a frame in write access cycle 3, i.e., field 3 is dropped. Even though write cycle is shown as being in a high state in FIG. 5, it appears low to the switching logic as a result of the mask. As a result, a read buffer switch SW-3 occurs on the rising edge of the non-read sub-period SP1 of read access cycle 3. After the switch, COUNT is reset to zero and the write mask is disabled.

In read access cycle 4, the frame stored in buffer B is fetched, since the last complete frame was written to buffer B. On the rising edge of the non-read sub-period SP1 of read access cycle 4, the state of the write cycle is checked. Because the write cycle is in a write sub-period SP3, the switching opportunity in read access cycle 4 is a non-executed switching opportunity. As a result of this non-executed switching opportunity, COUNT is incremented and the mask is set again.

In read access cycle 5, the frame stored in buffer B is fetched. On the rising edge of the non-read sub-period SP1 of read access cycle 5, the state of the write cycle is checked. Because the mask is enabled, the switching opportunity is executed. This executed switching opportunity is labeled SW-4 in FIG. 5.

In write access cycle 5, because the write cycle is masked, the video source 20 does not write a frame, i.e., field 5 is dropped.

In read access cycle 6, the frame stored in buffer A is fetched. On the rising edge of the non-read sub-period SP1 of read access cycle 6, the state of the write cycle is checked. The switching opportunity in read access cycle 6 is a non-executed switching opportunity because IN DP is in a write sub-period, SP3. Thus, the mask is set once again.

In read access cycle 7, the frame stored in buffer A is fetched. On the rising edge of the non-read sub-period of read access cycle 7, the state of the write cycle is checked. Because the write cycle is in a non-display sub-period SP4, the switching opportunity is executed. As a result of this buffer switch, COUNT is reset. Because COUNT is reset before the start of the write cycle immediately subsequent to COUNT exceeding the threshold, i.e., write cycle 7, the mask is reset. Thus, the mask set in read access cycle 6 is disabled before it prevents the writing of a frame in write cycle 7.

As can be seen from FIG. 5, just two fields (fields 3 and 5) are dropped. In comparison, in the example of FIG. 3 in which the same waveforms are depicted, but without the masking feature, four fields are dropped (fields 2, 3, 4, and 5). In addition, the fields that are dropped in FIG. 5 are not consecutive fields; the dropped fields 3 and 5 are separated by field 4 that is read out for display, which further minimizes appearance of video image freezing. In other words, one or more non-dropped fields or frames interrupt what would otherwise be an unbroken sequence of dropped fields of frames. In short, fewer fields or frames are dropped and the fields or frames that are dropped are not consecutive frames. While field or frame dropping is not completely eliminated, the number of dropped fields or frames may be controlled so that their appearance is not noticeable.

The threshold may be set to values other than one. In general, the threshold may be set to a value that is suitable for the particular environment and the degree to which some deterioration in video quality is acceptable. The threshold may be adjusted based on what is observed in a test setup. Different environments, i.e., different read and write frame (or field) rates and different duty cycles for the read and write access cycles may provide different results than those presented in FIG. 5. Similarly, different threshold values may provide different results than those presented in FIG. 5. In general, however, the number of fields or frames that are dropped when the principles of the invention are employed will be less than the number of fields or frames dropped when the principles are not employed. Further, any fields or frames that are dropped will be spread out, with non-dropped fields or frames being inserted between the dropped fields or frames. In addition, any comb effect that may be produced will involve fields from adjacent frames and hence be less likely to be noticeable than comb effects that occur when the principles of the invention are not employed.

From the example presented in FIG. 5, it may be seen that acceptable video may be obtained even though limitation (b) is not be satisfied, i.e., the write sub-periods SP3 of the write access cycles may be equal to or longer than the full read access cycles. Similarly, it may be seen that acceptable video may be obtained even though the alternative limitation is not satisfied, i.e., the non-write sub-periods SP4 may be equal to or shorter than the read access cycles $T_{OUT}$.

In the examples described above, a switching opportunity occurs at the start of the non-read sub-period, SP1, i.e., on the rising edge of OUT VNDP. However, in one embodiment, a switching opportunity may extend beyond the starting point of the non-read sub-period, SP1. In this alternative, a switching opportunity may begin with the rising edge of OUT VNDP and continue for a portion of the non-read sub-period, SP1. Any desired portion may used. For example, the portion may be 17%, 25%, 50%, 56%, 75%, 82%, or 100% of the non-read sub-period, SP1. Generally, the switching opportunity may extend until reading out of frames from the memory 22 for display begins, that is, until the falling edge of edge of OUT VNDP.

Figure 6:
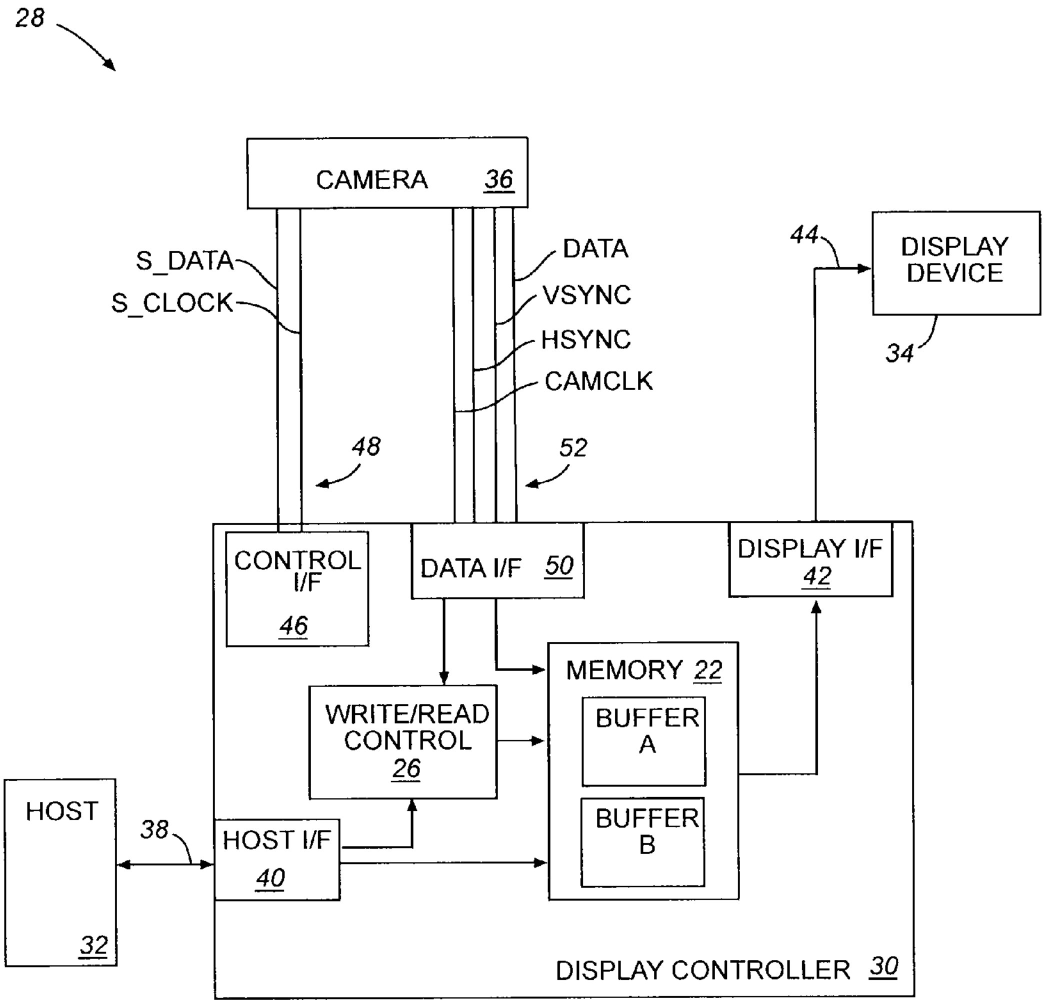
FIG. 6 illustrates a system for displaying video data according to one embodiment.

Referring to FIG. 6, a system 28 including a display controller 30 according to one embodiment is shown. The system 28 may be any digital system or appliance; where it is a portable appliance such as a mobile telephone, a personal digital assistant, a digital camera, or a portable media player, it may be powered by a battery (not shown). The system 28 preferably may include a host 32, a display device 24, and a video source 20. The display controller 30 interfaces the host and camera with the display device. The display controller is typically separate (or remote) from the host, camera, and display device.

The host 32 is typically a microprocessor, but may be a digital signal processor, computer, or any other type of device for controlling digital circuits. The host may communicate with the display controller 30 over a bus 38 to a host interface 40 in the display controller 30. The display controller 30 includes a display device interface 42 for interfacing between the display controller and the display device over a display device bus 44.

The video source 20 acquires pixel data and provides frames of video data to the display controller 30. In addition, the host may provide frames of video data to the display controller 30. The video source 20 may be programmatically controlled through a control interface 46. The control interface 46 is coupled with a control bus 48. In one embodiment, the control bus 48 is a serial bus. The control interface 46 may transmit control data ("S_Data") to and from the video source and a clock signal ("S_Clock") for clocking the control data. The display controller 30 may also have a parallel data interface 50 for receiving video data output over a plurality of DATA lines of a data bus 52 from the video source 20. In addition to data, the data bus 52 includes lines for vertical and horizontal synchronizing signals ("VSYNC" and "HSYNC"), and a camera clock signal CAMCLK for clocking pixel data out of the video source.

Frames of video data from the video source 20 are provided to the memory 22. Alternatively, frames of video data from the host 32 may be provided to the memory 22. The write/read control unit 26 monitors the receipt of video data from the video source 20 and the host 32. The write/read control unit 26 includes a control that prevents the reading of a buffer currently being written to by a video source, e.g., the video source 20 or the host 38. In addition, the write/read control unit 26 incorporates principles of the invention for counting non-executed switching opportunities. The unit 26 compares a count of non-executed switching opportunities with a particular threshold. If the count value exceeds the threshold, a mask is set in the write access cycle subsequent to the count exceeding the threshold. As described above, when the write mask is set or enabled, the video source or host is prevented from writing to a buffer.

In one embodiment, some or all of the operations and methods described in this description may be performed by executing instructions that are stored in or on machine-readable media. In addition, units other than the write/read control unit 26 may perform some or all of the operations and methods described in this description by executing instructions that are stored in or on machine-readable media.

In this description, references may be made to "one embodiment" or "an embodiment." These references mean that a particular feature, structure, or characteristic described in connection with the embodiment is included in at least one embodiment of the claimed inventions. Thus, the phrases "in one embodiment" or "an embodiment" in various places are not necessarily all referring to the same embodiment. Furthermore, particular features, structures, or characteristics may be combined in one or more embodiments.

Although embodiments have been described in some detail for purposes of clarity of understanding, it will be apparent that certain changes and modifications may be practiced within the scope of the appended claims. Accordingly, the described embodiments are to be considered as illustrative and not restrictive, and the claimed inventions are not to be limited to the details given herein, but may be modified within the scope and equivalents of the appended claims. Further, the terms and expressions which have been employed in the foregoing specification are used as terms of description and not of limitation, and there is no intention in the use of such terms and expressions to exclude equivalents of the features shown and described or portions thereof, it being recognized that the scope of the inventions are defined and limited only by the claims which follow.

I claim:

1. A method comprising:

writing data to one of two frame buffers in write access cycles, each of the write access cycles having a write and a non-write sub-period, and concurrently reading out data to a display device from the other of the two frame buffers in read access cycles, each of the read access cycles having a read and a non-read sub-period, a switching opportunity occurring when a read access cycle is in a non-read sub-period;

executing a buffer switch by switching the writing of data and the reading of data to the respective opposite frame buffer during a switching opportunity while a write access cycle is in a non-write sub-period;

incrementing a count of the number of times a buffer switch is not executed during a switching opportunity because a write access cycle is in a write sub-period; and if the count exceeds a particular threshold, masking a write access cycle subsequent to the count exceeding the threshold.

2. The method of claim 1, wherein data is not written during a write access cycle that is masked.

3. The method of claim 1, wherein a buffer switch is executed during a switching opportunity when a read access cycle is in a portion of a non-read sub-period of a read access cycle and a write access cycle is in a non-write sub-period, the portion being less than the full non-read sub-period.

4. The method of claim 1, further comprising resetting the count after a buffer switch is executed.

5. The method of claim 1, wherein the data is compressed video data.

6. The method of claim 1, wherein the data is pixel format video data.

7. The method of claim 6, wherein the video data is written according to a progressive scan.

8. The method of claim 6, wherein the video data is written according to an interlaced scan.

9. The method of claim 6, wherein the video data is read out according to a progressive scan.

10. The method of claim 6, wherein the video data is read out according to an interlaced scan.

11. The method of claim 1, wherein a buffer switch is executed during a switching opportunity if a read access cycle starts a non-read sub-period while a write access cycle is in a non-write sub-period.

12. A display controller to control the writing of data to one of two frame buffers in write access cycles, each of the write access cycles having a write and a non-write sub-period, and the concurrent reading out of data to a display device from the other of the two frame buffers in read access cycles, each of the read access cycles having a read and a non-read sub-period, a switching opportunity occurring when a read access cycle is in a non-read sub-period, the display controller comprising:

a read/write control that:

executes a buffer switch by switching the writing of data and the reading of data to the respective opposite frame buffer during a switching opportunity while a write access cycle is in a non-write sub-period, increments a count of the number of times a buffer switch is not executed during a switching opportunity because a write access cycle is in a write sub-period, and masks a write access cycle if the count exceeds a particular threshold, the masked write access cycle being the write cycle subsequent to the count exceeding the threshold.

13. The display controller of claim 12, wherein the read/write control prevents the writing of data in a write access cycle that is masked.

14. The display controller of claim 12, wherein a buffer switch is executed during a switching opportunity when a read access cycle is in a portion of a non-read sub-period of a read access cycle and a write access cycle is in a non-write sub-period, the portion being less than the full non-read sub-period.

15. The display controller of claim 12, wherein the read/write control resets the count after a buffer switch is executed.

16. The display controller of claim 12, wherein the data is compressed video data.

17. The display controller of claim 12, wherein the read/write control executes a buffer switch during a switching opportunity if a read access cycle starts a non-read sub-period while a write access cycle is in a non-write sub-period.

18. A system to display video data, comprising:

a video source;

a memory having two frame buffers;

a display device; and a display controller to control the writing of data to one of the frame buffers in write access cycles, each of the write access cycles having a write and a non-write sub-period, and the concurrent reading out of data to a display device from the other of the two frame buffers in read access cycles, each of the read access cycles having a read and a non-read sub-period, a switching opportunity occurring when a read access cycle is in a non-read sub-period, the display controller including a read/write control that:

executes a buffer switch by switching the writing of data and the reading of data to the respective opposite frame buffer during a switching opportunity while a write access cycle is in a non-write sub-period, increments a count of the number of times a buffer switch is not executed during a switching opportunity because a write access cycle is in a write sub-period, and masks a write access cycle if the count exceeds a particular threshold, the masked write access cycle being the write cycle subsequent to the count exceeding the threshold.

19. The system of claim 18, wherein the read/write control prevents the writing of data in a write access cycle that is masked.

20. The system of claim 18, wherein a buffer switch is executed during a switching opportunity when a read access cycle is in a portion of a non-read sub-period of a read access cycle and a write access cycle is in a non-write sub-period, the portion being less than the full non-read sub-period.

21. The system of claim 18, wherein the read/write control resets the count after a buffer switch is executed.

22. The display controller of claim 16, wherein the data is pixel format video data.

23. The system of claim 18, wherein the read/write control executes a buffer switch during a switching opportunity if a read access cycle starts a non-read sub-period while a write access cycle is in a non-write sub-period.

* * * * *